United States Patent [19]

Wu

[11] 3,997,694

[45] Dec. 14, 1976

[54] CONTAINER COATED WITH A DUCTILE COATING OF AN ACRYLIC POLYMER HAVING REACTIVE SITES AND AN EPOXY RESIN

[75] Inventor: Souheng Wu, Wilmington, Del.

[73] Assignee: E. I. Du Pont de Nemours and Company, Wilmington, Del.

[22] Filed: July 3, 1975

[21] Appl. No.: 593,020

Related U.S. Application Data

[63] Continuation-in-part of Ser. No. 428,723, Dec. 12, 1973, Pat. No. 3,943,187.

[52] U.S. Cl. .................................. 428/35; 428/335; 428/418; 428/463; 428/461; 428/522
[51] Int. Cl.$^2$ ........................ B65D 1/12; B44D 1/50
[58] Field of Search ............ 428/35, 220, 418, 461, 428/522, 335; 427/239; 260/836, 834

[56] References Cited

UNITED STATES PATENTS

| | | | |
|---|---|---|---|
| 2,992,132 | 7/1961 | Melamed ........................... | 428/418 |
| 3,008,914 | 11/1961 | Fry ..................................... | 260/33.4 |
| 3,084,073 | 4/1963 | Kine et al. .................. | 260/29.6 NR |
| 3,198,850 | 8/1965 | Levantin ............................ | 260/834 |
| 3,215,756 | 11/1965 | Lombardi et al. .................. | 260/834 |
| 3,236,683 | 2/1966 | Berenbaum et al. ............... | 428/418 |
| 3,347,700 | 10/1967 | Gloyer et al. .................. | 428/461 X |
| 3,378,601 | 4/1968 | Tanaka et al. ..................... | 260/831 |
| 3,503,918 | 3/1970 | Le Sota et al. .................... | 260/29.7 |
| 3,684,617 | 8/1972 | Windecker ........................ | 156/330 |
| 3,758,633 | 9/1973 | Labana et al. ..................... | 260/836 |
| 3,783,006 | 1/1974 | Hahn et al. .................... | 427/239 X |
| 3,845,023 | 10/1974 | Dalibor ........................... | 260/80.73 |

*Primary Examiner*—P.E. Willis, Jr.

[57] ABSTRACT

A container, in particular aluminum and steel cans, having a dried and cured formable coating on the interior or on the exterior of the container and in which the coating is of the following compatible mixture of the film-forming constituents:

a. an acrylic polymer that has at least two or more reactive sites per chain such as carboxyl, hydroxyl, epoxide, methylol, amine or amide and has a number average molecular weight above 10,000 and a glass transition temperature of −20° to +50° C.; and b. an epoxy resin that has at least one epoxide group in combination with at least one hydroxyl group or epoxide group or combination thereof per polymer chain and has a number average molecular weight of 300 to 20,000;

wherein the film-forming constituents in the fully cured state have a brittle ductile transition temperature of −40° to +20° C. measured at an elongation rate of 10% per minute.

4 Claims, No Drawings

3,997,694

CONTAINER COATED WITH A DUCTILE COATING OF AN ACRYLIC POLYMER HAVING REACTIVE SITES AND AN EPOXY RESIN

CROSS-REFERENCE TO RELATED APPLICATIONS

This application is a continuation-in-part of my copending application Ser. No. 428,723, filed Dec. 12, 1973 now U.S. Pat. No. 3,943,187.

BACKGROUND OF THE INVENTION

This invention is directed to a coated container and in particular to a metal container coated with a composition that forms flexible and ductile finishes.

A current method for preparing cans utilized for packaging foodstuffs is to draw a flat aluminum or steel sheet into a low profile can body and then redraw this can into a deep can body by a second drawing step and optionally a bead is crimped on the open edge of the can. The can is then cleaned and a coating is sprayed on and baked. The cost of producing these cans can be substantially reduced by coating the aluminum or steel sheet before it is drawn with a flexible and ductile finish which will not fracture, crack or peel during the forming of the can. This eliminates the separate coating step after the can has been formed. Currently, polyvinyl chloride coatings have been used as a formable finish on the aluminum sheet. However, after forming the can and particularly after forming the bead, a large number of failures have been noted; and also, the finish is not resistant to food staining such as staining with pumpkins, tomatoes, tomato soup or ketchup.

The container of this invention is coated with a composition that utilizes a blend of an acrylic polymer and epoxy resin and forms a finish which is ductile, and has good adhesion to the substrate and is resistant to food staining.

SUMMARY OF THE INVENTION

A container having a coating of a composition that contains as the film-forming constituents a compatible mixture that consists essentially of
 a. an acrylic polymer having at least two or more reactive sites per polymer chain that are either carboxyl, hydroxyl, epoxide, methylol, amide, amine or mixtures of any of the above, having a number average molecular weight above 10,000 and a glass transition temperature of −20° to +60° C.; and
 b. an epoxy resin having at least one epoxide group in combination with at least one hydroxyl group or epoxide group or combination thereof per polymer chain and having a number average molecular weight of 300 to 20,000;
wherein the film-forming constituents in the fully cured state have a brittle ductile transition temperature of −40° to +20° C. measured at an elongation rate of 10% per minute.

DESCRIPTION OF THE INVENTION

The container usually has a coating of about 0.2–2.0 mils in thickness but for most uses, particularly for an interior finish, the coating is about 0.3–0.5 mil in thickness. The coating can be on the exterior or interior or both of the container but is primarily designed to be used as an interior coating. Generally, the container is a drawn metal can of aluminum or steel which is coated before drawing with the coating composition.

The coating composition used in this invention preferably has a 25–50% by weight solids content of film-forming constituents. The composition can be pigmented with a variety of the well known pigments, in a pigment volume concentration of about 1–15%.

The film-forming constituents of the composition are as follows: 60–95% by weight of an acrylic polymer, and correspondingly 5–40% by weight of an epoxy resin. Preferably, 70–80% by weight of the acrylic polymer is used with 20–30% by weight of the epoxy resin as the film-forming constituents of the composition.

The acrylic polymer has at least two or more reactive sites per polymer chain which can be either a carboxyl group, a hydroxyl group, an epoxide group, a methylol group, an amine group, and amide group or a mixture of two or more of these groups. The polymer has a number average molecular weight above 10,000 and usually has a number average molecular weight of 25,000–70,000 determined according to gel permeation chromotography. The polymer has a glass transition temperature of −20° to +60° C.

The acrylic polymer used in this invention is prepared by a conventional solution or emulsion polymerization technique. In a conventional solution polymerization process for preparing the acrylic polymer, the monomers, solvents and polymerization catalysts are charged into a conventional reaction vessel and heated to about 75°–150° C. for about 2–6 hours to form a polymer that has the aforementioned molecular weight. Typical polymerization catalysts that are used are ditertiary butyl peroxide, tertiary butyl perbenzoate, benzoyl peroxide and the like.

The acrylic polymer can also be prepared by a conventional emulsion polymerization technique in which the monomers are charged into an aqueous medium along with the polymerization catalysts such as ammonium persulfate, hydrogen peroxide and the like with or without a reducing agent such as ferrous sulfate. The reaction mixture is heated to a temperature of about 60°–95° C. for about 2 to 4 hours to form the emulsion.

The constituents of the acrylic polymer are chosen so that the acrylic polymer has a glass transition temperature of −20° to +60° C. determined by differential thermal analysis. Also, the acrylic polymer is chosen so that the resulting product will have a brittle ductile transition temperature of −40° to +20° C.

The brittle ductile transition is the temperature at which the elongation at break of a strip of free film of the fully cured coating composition about 2.0–4.0 determined on an Instron testing machine using an elongation rate of 10% per minute.

It is necessary that the coating composition used in this invention in its fully cured state has a brittle ductile transition temperature within the aforementioned range so that the finish will not crack or peel under the severe forming conditions utilized to prepare a deep-drawn steel or aluminum can.

The acrylic polymer generally is comprised of hard segments, soft segments and reactive constituents which will provide the aforementioned reactive sites to the polymer chain.

One typical acrylic polymer contains the following constituents:
 10–50% by weight of styrene, methyl styrene, methylmethacrylate or acrylonitrile,
 40–89.5% by weight of an alkyl acrylate having 1–18 carbon atoms in the alkyl group or an alkyl methacrylate having 2–18 carbon atoms in the alkyl group, and 0.5–10% by weight of an unsaturated carboxylic acid.

Typical alkyl acrylates and alkyl methacrylates that can be used to prepare the acrylic polymer are as follows: methyl acrylate, ethyl acrylate, propyl acrylate, isopropyl acrylate, butyl acrylate, isobutyl acrylate, pentyl acrylate, hexyl acrylate, 2-ethylhexyl acrylate, nonylacrylate, decyl acrylate, lauryl acrylate, stearyl acrylate and the like; ethyl methacrylate, propyl methacrylate, isopropyl methacrylate, butyl methacrylate, isobutyl methacrylate, hexyl methacrylate, 2-ethylhexyl methacrylate, nonyl methacrylate, decyl methacrylate, and lauryl methacrylate, stearyl methacrylate and the like.

Typical acids that are useful to prepare the acrylic polymer are acrylic acid, methacrylic acid, maleic acid, itaconic acid, and the like. Preferred are acrylic acid and methacrylic acid.

One particularly useful acrylic polymer is of the following composition:
- 30–40% by weight of methyl methacrylate,
- 50–65% by weight of ethyl acrylate, and
- 5–10% by weight of acrylic acid.

Another particularly useful acrylic polymer comprises the following constituents:
- 10–50% by weight of styrene, methyl styrene, methylmethacrylate, or acrylonitrile,
- 30–88.5% by weight of an alkyl methacrylate having 2–18 carbon atoms in the alkyl group or an alkyl acrylate having 1–18 carbon atoms in the alkyl group,
- 1–10% by weight of an alkoxymethyl acrylamide or an alkoxymethyl methacrylamide, and
- 0.5–10% by weight of an unsaturated carboxylic acid.

The aforementioned alkyl acrylates and methacrylates and unsaturated carboxylic acids are utilized to prepare the above polymer. Typical alkoxymethyl acrylamide and alkoxymethyl methacrylamide monomers are as follows: butoxymethyl acrylamide, butoxymethyl methacrylamide, isobutoxymethyl acrylamide and isobutoxymethyl methacrylamide.

One particularly useful acrylic polymer of this type which forms a high quality composition comprises the following constituents:
- 10–25% by weight of styrene,
- 65–87.5% by weight of alkyl acrylate having 2–4 carbon atoms in the alkyl group, such as ethyl acrylate,
- 2–7% by weight of butoxymethyl acrylamide, and
- 0.5–3% by weight of acrylic acid or methacrylic acid.

The following are other monomers which can be used with styrene, methyl styrene, acrylonitrile, and the alkyl acrylates and alkyl methacrylates to form the acrylic polymer having the reactive sites: hydroxy ethyl acrylate, hydroxy propyl acrylate, hydroxy butyl acrylate, hydroxy ethyl methacrylate, hydroxy propyl methacrylate, hydroxy butyl methacrylate, glycidyl acrylate, glycidyl methacrylate, aminoethyl acrylate, aminoethyl methacrylate, acrylamide, methacrylamide, methylol acrylamide, and methylol methacrylamide.

The epoxy resin utilized in a coating composition used in this invention has at least one epoxide group with it least one hydroxyl group or epoxide group or combination thereof per polymer chain and has a number average molecular weight of 300 to 20,000 determined according to gel permeation chromatography. Preferably, the epoxy resin has a structure

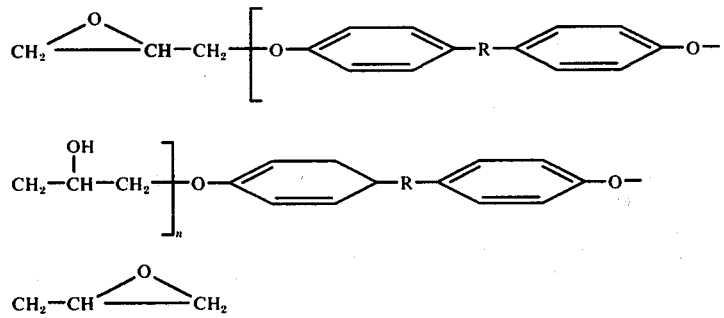

wherein R is an alkylene group having 1–4 carbon atoms and wherein n is an integer sufficiently large to provide a polymer having the above molecular weight.

The epoxy resins are usually prepared by reacting epichlorohydrin and the bisphenol such as bisphenol A or bisphenol F to form epoxy resin with the desired molecular weight. Preferably, an epoxy resin is utilized in which R is a methylene group or an isopropylidene group. Preferred epoxy resins of this type have an epoxide equivalent of 875–2500. The epoxide equivalent is the grams of resin containing 1 gram equivalent of epoxide. Typically preferred resins are "Epon" 1004 and Epon 1007.

Any of the conventional solvents and diluents can be used to prepare the composition or reduce the composition to an application viscosity. Typical solvents are xylene, toluene, butylacetate, acetone, methylethyl ketone, methyl isobutyl ketone, alcohols such as methanol, ethanol, propanol, butanol, and the like, ethylene glycol monobutyl ether, ethylene glycol monobutyl ether acetate, ethylene glycol monoethyl ether acetate, ethylene glycol monoethyl ether, ethylene glycol dibutyl ether and the like, hexane, mineral spirits and other aliphatic, cycloaliphatic or aromatic hydrocarbon solvents, and other esters, ethers, ketones and alcohols. If the novel composition is to be in an aqueous medium, water miscible solvents such as acetone, butanol, ethanol, propanol, ethylene glycol monoethyl ether and the like are used.

To form an aqueous emulsion, dispersion or hydrosol, sufficient basic compound is added to disperse the polymer in water and provide a pH of about 5–10. Generally, a pH of about 6.5–8.5 is used. An acrylic polymer having a high acid content can be made water soluble by the addition of a basic compound. Storage stability also can be improved by the addition of basic compounds.

Typically useful basic compounds are ammonia, primary amines, secondary amines, tertiary amines, hydroxyl amines, alkanolamines and the like. Typical compounds are monoethanolamine, methylethanolamine, methyldiethanolamine, dimethylethanolamine, triethylamine, triisopropanolamine, hexanolamine, octylamine, ethylenediamine, diethylenetriamine, triethylenetetramine, hexamethylenetetraamine, tetraethylenediamine and the like. Preferred are diethylaminoethanol, dimethylethanolamine and triethylamine since these compounds form a stable dispersion.

The following are examples of the many types of pigments that can be utilized in the novel coating composition of this invention: titanium dioxide, iron oxide, metal hydroxides, metal flakes, metal powders, sulfates, carbonates, carbon black, silica, talc, phthalocyanines and other organic and inorganic pigments.

Extender pigments in a 2–8% pigment volume concentration can be used as diatomaceous earth, silica, mica and talc to improve blocking resistance of the resulting finish and to provide a flattened non-glossy finish.

Under some conditions, it may be desirable to add up to 5% by weight of a phenolic or aminoplast resin such as a phenol formaldehyde resin, and alkylated melamine formaldehyde resin having 1–4 carbon atoms in the alkyl group, a urea formaldehyde resin, a resorcinol formaldehyde resin or a benzoquanamine formaldehyde resin. Typical alkylated melamine formaldehyde resins are hexakis (methoxymethyl)melamine, butylated melamine formaldehyde resins, partially methylated melamine formaldehyde resins and the like.

The composition can be applied to a variety of substrates used for containers such as glass, plastics, metals such as aluminum, steel and the like by the usual methods such as spraying, electrostatic spraying, electrocoating, roller coating, dipping, brushing, flow coating, coil coating and the like. The coating is then baked according to conventional procedures.

Typical baking conditions are 150° to 370° C. for 5 seconds to 45 minutes to form a film about 0.2 to 2.0 mils thick. Preferably, the composition is baked at 175° to 220° C. for 5 to 25 minutes. For accelerated baking conditions, the following conditions are used of 235° to 290° C. for 10 to 60 seconds.

The resulting finish has excellent elongation and forming characteristics and has good resistance to food staining and is particularly well suited as an interior or exterior coating for a formable metal container. These characteristics also make the composition useful as a finish for formable metal parts such as used in appliances, automobiles and trucks.

The metal container preferably is formed from an aluminum or steel sheet that is coated with the above composition either on one side or both sides. The container is formed by deepdrawing the coated sheet which may be accomplished in several stages and optionally, the container is ironed to complete the container. Optionally, a bead is crimped on the open edge of the container. The resulting container has a finish that does not stain, chip, crack or peel.

The following Examples illustrate the invention. The parts and percentages are by weight unless otherwise specified.

EXAMPLE 1

An acrylic polymer is prepared as follows:

|  | Parts By Weight |
|---|---|
| Methyl methacrylate monomer | 228.0 |
| Ethyl acrylate monomer | 336.0 |
| Acrylic acid monomer | 36.0 |
| Benzoyl peroxide | 1.8 |
| Isopropanol | 77.0 |
| Ethylene glycol monoethyl ether | 180.0 |
| Total | 858.8 |

The above ingredients are charged into a mixing vessel and then premixed. About ¼ of the premix is placed in a reaction vessel equipped with a stirrer, a reflux condenser, a thermometer, a nitrogen inlet and an addition funnel. The ingredients are blanketed with nitrogen throughout the entire reaction. The ingredients are heated to a slow reflux temperature of about 105° C. and then the remainder of the ingredients are slowly added over a 2-hour period while maintaining the above reflux temperature. The reaction mixture is held at its reflux temperature for an additional 1 hour and then cooled to room temperature. The resulting polymer solution has a solids content of about 70.3% and the apparent conversion is about 100% to a polymer of methyl methacrylate/ethyl acrylate/acrylic acid having a weight ratio of 38/56/6. The polymer has a weight average molecular weight of about 84,000 and a number average molecular weight of about 29,000, determined by gel permeation chromatography. The polymer has a viscosity at 104° C using a Brookfield Viscometer at 20 RPM of 1,605 centipoises, at 50 RPM 1,650 centipoises and at 100 RPM 1,676 centipoises. The polymer has a glass transition temperature of 16° C.

An acrylic epoxy resin hydrosol is prepared as follows:

|  | Parts by Weight |
|---|---|
| Acrylic polymer solution (prepared above) | 660.0 |
| Epoxy resin (Epon 1004*) | 60.5 |
| Diethylaminoethanol | 27.3 |
| Water | 1009.8 |
| TOTAL | 1757.6 |

* Epon 1004 - epoxy resin of the formula

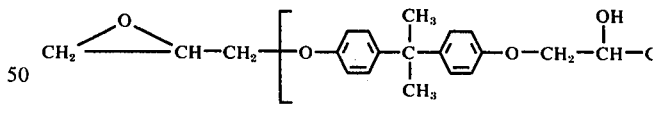

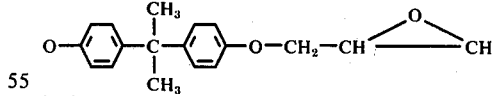

having a Gardner Holdt viscosity of Q-U measured at 40% weight solids in diethylene glycol monoethylether at 25° C and an epoxide equivalent of 875–1000, wherein the epoxide equivalent is the grams of resin containing 1 gram equivalent of epoxide.

The acrylic polymer solution is heated to a slow reflux temperature of about 105° C. and then the amine is added with constant agitation. The solid epoxy resin is next added to the batch and the mixture is held at its reflux temperature about 15 minutes. The heat is then turned off and water is added to the reaction mixture over a 60-minute period to invert the composition to a hydrosol. The resulting hydrosol has a solids content of about 30%, an acrylic/epoxy ratio of 88.5/11.5, a pH (60% neutralization of acrylic acid) of 7.6 and a viscosity at room temperature measured on a Brookfield Viscometer at 20 RPM of 116 centipoises, at 50 RPM of 128 centipoises, at 100 RPM of 160 centipoises. The composition has an organic solvent content of about 11%.

A mill base is prepared as follows:

|  | Parts by Weight |
|---|---|
| Acrylic/epoxy resin hydrosol (prepared above) | 150.0 |
| Titanium dioxide pigment | 225.0 |
| Ethylene glycol monobutyl ether | 7.5 |
| Water | 67.5 |
| TOTAL | 450.0 |

The above ingredients are charged into a ceramic ball mill and milled for about 16 hours to provide a mill base having a pigment to binder ratio of 5/1, and a resin content of 10% and a pigment content of 50%.

A pigmented hydrosol composition is prepared as follows:

|  | Parts by Weight |
|---|---|
| Acrylic/Epoxy resin hydrosol (prepared above) | 648.4 |
| Mill base (prepared above) | 133.0 |
| Total | 781.4 |

The above ingredients are thoroughly blended together to provide a composition that has a solids content of about 35%, a resin content of 26.6%, a pigment to binder ratio of about 32/100 and a pH of 7.8. The viscosity of the composition at room temperature measured on a Brookfield Viscometer at 20 RPM is 100 centipoises, at 50 RPM is 116 centipoises and at 100 RPM is 152 centipoises.

The brittle ductile transition temperature of the composition is −15° C. The brittle ductile transition temperature of the composition is determined on a free film about 0.3 mil thick of the composition which is prepared by drawing down the composition on a glass plate and baking the composition at about 290° C. for 30 seconds and then the resulting film is stripped off. The film is annealed in a low temperature oven and then samples are cut from the film and the elongation at break of the samples is determined on an Instron testing machine at an elongation rate of 10% per minute. The temperature at which the elongation at break increases exponentially is the brittle ductile transition temperature.

The above composition is drawn down onto both sides of 5050H19 aluminum panels of various sizes and then baked at 290° C. for about 25 to 35 seconds to form a finish about 0.3–0.4 mil thick. The following tests were conducted on the coated panels:

Formability Test

Circular blanks of the above coated aluminum panel 82 millimeters in diameter are prepared. The blank is first drawn into a shallow cup resulting in a 45% diameter reduction; next the cup is redrawn into a deep can at an additional 20% diameter reduction; third the cup is drawn into a deeper can with a 22% diameter reduction. After each of the drawing steps, an acidified copper sulfate solution is placed into the can to stain any cracks or cuts in the finish. No cracks, cuts or loss of adhesion are noted in the finish after any of the drawing steps.

After the can is formed, the upper one-fifth of the can is cut off and flattened and bent through a 1½ T bend so that the bend axis is in the cirumferential direction and the interior coating is elongated. The coating is examined for cracks as above and another portion of the can is bent through a 2 T bend and the coating is examined for cracks. No cracks in the coating are noted.

Process/Product Resistance Test

The above prepared 2 × 4 inch coated aluminum panels are placed in 150 milliliter size beakers, one panel per beaker which is filled to the 110 milliliter mark with distilled water, another with pumpkin pulp and another with tomato soup, which has a pH of about 4.4. The beakers are placed inside a four-quart cast aluminum pressure cooker on top of a perforated cooking plate. The bottom of the pressure cooker is filled with distilled water to the top of the cooking plate and the pressure cooker is securely closed, then heated until steam emerges continuously from the vent. The pressure regulator is then placed on the vessel and the cooking time is started the instant the pressure regulator indicates 15 pounds per square inch. After the end of the 60 minute cooking time, the pressure cooker is quenched with cool water. Cooking conditions are maintained at 120° C and 15 pounds per square inch gauge pressure throughout the cooking process. The panels are then removed and the coating is examined on each panel for staining, adhesion, blistering and blushing. No staining of the coating is noted, the coating has excellent adhesion to the metal substrate and no blistering or blushing of the coated panel is noted.

EXAMPLE 2

An acrylic/epoxy resin polymer solution is prepared as follows:

|  | Parts by Weight |
|---|---|
| Methyl methacrylate monomer | 210.0 |
| Ethyl acrylate monomer | 342.0 |
| Acrylic acid monomer | 48.0 |
| Benzoyl peroxide | 2.4 |
| Isopropanol | 78.0 |
| Ethylene glycol monoethyl ether | 178.0 |
| Epoxy resin (Epon 1007*) | 112.4 |
| Diethylaminoethanol | 4.0 |
| TOTAL | 974.8 |

*Epon 1007 resin (epoxy resin having the general formula as described in Example 1 and having a Gardner Holdt viscosity of Y-Z measured as described in Example 1 and an epoxide equivalent of 2000–2500).

The above ingredients are premixed, taking particular care to dissolve the epoxy resin. About ¼ of the above premixed ingredients are charged into a reaction vessel equipped as in Example 1 and heated to a slow reflux temperature of about 105° C. under a blanket of nitrogen. The remainder of the premixed ingredients is slowly added over a two-hour period while maintaining the above reflux temperature. The following ingredients are then blended together:

|  | Parts by Weight |
|---|---|
| Benzoyl peroxide | 0.6 |
| Isopropanol | 10.0 |
| Ethylene glycol monoethyl ether | 10.0 |
| TOTAL | 26.6 |

The above ingredients are premixed and slowly added to the reaction mixture over a 30 minute period while maintaining the above reflux temperature and the reaction mixture is maintained at its reflux temperature for an additional 30 minutes.

The resulting polymer solution contains the acrylic resin to epoxy resin in a weight ratio of 84.2 to 15.8 in which the acrylic polymer is of methyl methacrylate/ethyl acrylate/acrylic acid in a weight ratio of 35/57/8. The resulting polymer has a number average molecular weight of about 28,000 and a weight average molecular weight of about 107,000 and a glass transition temperature of 14° C. The viscosity of the composition measured at 98° C. using a Brookfield Viscometer at 20 RPM is 13,600 centipoises, at 50 RPM 13,100 centipoises and at 100 RPM 10,100 centipoises.

The above composition is converted into an acrylic-/epoxy hydrosol as follows:

|  | Parts by Weight |
|---|---|
| Acrylic/Epoxy resin polymer solution (prepared above) | 580.0 |
| Diethylaminoethanol | 32.4 |
| Water | 771.3 |
| TOTAL | 1383.7 |

The acrylic/epoxy soluton is heated to 110° C. and the heat is removed and the amine is added. Then the water is added over a 60-minute period with vigorous agitation. The resulting composition has a 30% solids content, an acrylic/epoxy ratio of 84.22/15.78, an organic solvent content of 11.8%, a diethylaminoethanol content of 2.3%, a pH of 7.4 and a viscosity measured at room temperature using Brookfield Viscometer at 10 RPM of 3,300 centipoises, at 20 RPM, 3,250 centipoises, 50 RPM, 3,200 centipoises and 100 RPM of 3,050 centipoises.

A mill base is prepared as follows:

|  | Parts by Weight |
|---|---|
| Acrylic/Epoxy hydrosol (prepared above) | 150.0 |
| Titanium dioxide pigment | 225.0 |
| Ethylene glycol monobutyl ether | 7.5 |
| Water | 67.5 |
| TOTAL | 450.0 |

The above ingredients are charged into a ceramic ball mill and milled for 4½ hours to form a mill base.

A pigmented composition is prepared as follows:

|  | Parts by Weight |
|---|---|
| Acrylic/Epoxy hydrosol (prepared above) | 500.0 |
| Mill base (prepared above) | 102.6 |
| Water | 38.6 |
| TOTAL | 641.2 |

The above ingredients are thoroughly blended together to form the pigmented coating composition. The resulting composition has a total solids of 33.0%, a resins solids of 25%, a pigment content of 8%, a pigment to binder ratio of 32/100, a pH of 7.5 and a viscosity measured at room temperature using a Brookfield Viscometer at 10 RPM of 246 centipoises, at 20 RPM of 232 centipoises, at 50 RPM of 230 centipoises and at 100 RPM of 235 centipoises.

The composition has a brittle ductile transition temperature of −12° C. determined as in Example 1.

The above composition is drawn down onto both sides of 5050H19 10 mil aluminum panels with a wire wound rod and baked at 290° C. for 25 to 35 seconds to form a finish of 0.3 to 0.4 mil thick. The finish is tested as in Example 1.

The finish exhibits no cracks, cuts or loss of adhesion after being drawn into a can and no cracks or cuts are noted in the T bend tests.

The finish is not stained after exposure to tomato soup or pumpkin pulp and the finish has excellent adhesion to the substrate with no blistering or blushing of the finish being noted.

EXAMPLE 3

An acrylic polymer solution is prepared as follows:

|  | Parts by Weight |
|---|---|
| Styrene monomer | 140.00 |
| Ethyl acrylate monomer | 612.00 |
| Methacrylic acid monomer | 12.00 |
| Acrylamide | 16.00 |
| Butanol | 380.00 |
| Hydrocarbon solvent having a boiling point of 150 – 190° C. and an aniline point of 28° C. | 177.00 |
| Portion 2 | |
| Ditertiary butyl peroxide | 4.64 |
| Hydrocarbon solvent (described above) | 5.00 |
| Portion 3 | |
| Tertiary butyl perbenzoate | 6.21 |
| Hydrocarbon solvent (described above) | 50.00 |
| Portion 4 | |
| Hydrocarbon solvent (described above) | 24.00 |
| Portion 5 | |
| Butanol formaldehyde | 38.40 |
| Hydrocarbon solvent (described above) | 30.00 |
| Portion 6 | |
| Hydrocarbon solvent (described above) | 30.00 |
| TOTAL | 1525.25 |

The constituents of Portion 1 are premixed and then charged into a reaction vessel described in Example 1 and then heated to 100° C. under a nitrogen blanket with constant agitation. Portion 2 is added in the order shown. An exothermic reaction takes place and is allowed to subside and then the reaction mixture is heated to a slow reflux of about 110° C. and held for 30 minutes. The temperature is lowered to 100° C. and then Portion 3 is premixed and slowly added over a 75-minute period while maintaining the temperature at about 100° C. Portion 4 is then passed through the reflux condenser and the reaction mixture is held at its reflux temperature of about 114° C. for an additional 90 minutes. Portion 5 is added in the order shown and the reaction mixture is held at its reflux temperature for 60 minutes and then 46.5 grams of solvent are stripped off in the following 2-hour period while maintaining the reaction mixture at its reflux temperature. Portion 6 is then added and the heat is removed and the reaction mixture is cooled to room temperature.

The resulting composition has a polymer solids content of 55.2% wherein the polymer is a styrene/ethyl acrylate/methacrylic acid/butoxymethylacrylamide in a weight ratio of 17.5/76.5/1.5/4.5. The polymer has a number average molecular weight of 47,000, a weight average molecular weight of 106,000 determined by gel permeation chromatography using polystyrene as the standard and a glass transition temperature of 6° C. The composition has a viscosity at room temperature using a Brookfield Viscometer at 5 RPM of 3,936 centipoises and at 100 RPM of 3,936 centipoises.

An acrylic/epoxy solution is prepared as follows:

|  | Parts by Weight |
| --- | --- |
| Acrylic polymer solution (prepared above) | 427.2 |
| Epoxy resin solution (40% solids of Epon 1004 resin described in Example 1) | 160.5 |
| Lubricant (15% solids polyethylene wax) | 12.0 |
| Solvent blend (50% hydrocarbon solvent described above and 50% butanol) | 150.3 |
| TOTAL | 750.0 |

The above ingredients are thoroughly blended together to form a 40% solids solution wherein the ratio of acrylic polymer to epoxy resin is 78.6/21.4, the composition has a viscosity at room temperature using a Brookfield Viscometer at 10 RPM of 420 centipoises.

A mill base is prepared as follows:

|  | Parts by Weight |
| --- | --- |
| Titanium dioxide pigment | 250.0 |
| Acrylic/Epoxy resin solution (prepared above) | 90.6 |
| Hydrocarbon solvent (described above) | 63.8 |
| Butanol | 63.7 |
| Ethylene glycol monobutyl ether | 31.9 |
| TOTAL | 500.0 |

The above ingredients are charged into a ceramic ball mill and milled for 16 hours to form a white mill base.

A coating comosition is prepared as follows:

|  | Parts by Weight |
| --- | --- |
| Acrylic polymer solution (prepared above) | 427.2 |
| Epoxy resin solution (40% solids of Epon 1004) | 160.5 |
| Mill base (prepared above) | 232.7 |
| Lubricant (described above) | 17.6 |
| Solvent blend (described above) | 168.8 |
| TOTAL | 1006.8 |

The above ingredients are thoroughly blended together to form the coating composition. The composition has a solids content of 43.7%, a pigment to binder ratio of 36/100, acrylic/epoxy resin ratio of 78.6/21.4 and a Brookfield viscosity at room temperature at 10 RPM of 350 centipoises, at 20 RPM of 345 centipoises, at 50 RPM of 340 centipoises and 100 RPM of 348 centipoises.

The composition has a brittle ductile transition temperature of −25° C. determined as in Example 1.

The above coating composition is drawn down onto both sides of a 10 mil 5050H19 aluminum plate as in Example 1 to form a finish about 0.3–0.4 mil thick. The finish is tested as in Example 1 and exhibits excellent formability without cracking or loss of adhesion of the finish and excellent resistance to process/product test in which the finish shows stain resistance and good adhesion to the substrate. No blistering or blushing of the finish is noted under these test conditions.

The invention claimed is:

1. A container coated on at least one side with a dried coalesced coating about 0.2–2 mils in thickness, in which the coating consists essentially of a fully cured composition of
    a. 60–95% by weight of an acrylic polymer of polymerized units of 10–25% by weight of styrene, 65–87.5% by weight of an alkyl acrylate having 2–4 carbon atoms in the alkyl group, 2–7% by weight of butoxymethyl acrylamide, 0.5–3% by weight of acrylic acid or methacrylic acid having a number average molecular weight of above 10,000 determined according to gel permeation chromatography and a glass transition temperature of −20° to +60° C, and
    b. 5–40% by weight of an epoxy resin having at least one terminal vic epoxide group in combination with at least one hydroxyl group or epoxide group or mixture thereof per polymer chain and having a number average molecular weight of 300 to 20,000 determined as above;
    wherein the film-forming constituents in the fully cured state have a brittle ductile transition temperature of −40° C to +20° C measured at an elongation rate of 10% per minute on an Instron testing machine using a free film about 2–4 mils thick.

2. The container of claim 1 in which the composition consists essentially of about
    a. 70–80% by weight of an acrylic polymer consisting essentially of polymerized units of about
        10–25% by weight of styrene,
        65–87.5% by weight of ethyl acrylate,
        2–7% by weight of butoxymethyl acrylamide,
        0.5–3% by weight of acrylic acid; and
    b. 20–30% by weight of an epoxy resin of the formula

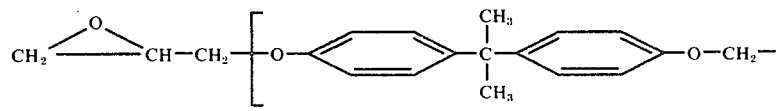

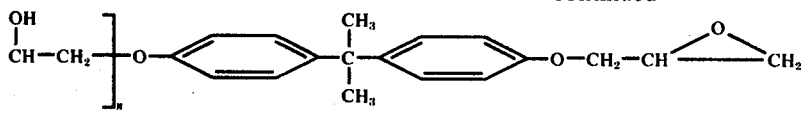

where *n* is a positive integer sufficiently large to provide a number average molecular weight of 300 to 20,000 and having an epoxide equivalent of 875–2,500.

3. A container which is formed by deep drawing a sheet of metal having on at least one side a dried coalesced coating about 0.2–2.0 mils in thickness of the composition of claim 1.

4. The container of claim 3 in which the sheet of metal is of aluminum or steel.

* * * * *